US007860846B2

(12) United States Patent
Takahashi et al.

(10) Patent No.: US 7,860,846 B2
(45) Date of Patent: Dec. 28, 2010

(54) DEVICE, METHOD, AND COMPUTER PROGRAM PRODUCT FOR OUTPUTTING STORAGE LOCATION OF VERIFICATION-TARGET CHARACTER STRING

(75) Inventors: Michiko Takahashi, Yokohama (JP); Tadayuki Yoshida, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 12/048,492

(22) Filed: Mar. 14, 2008

(65) Prior Publication Data

US 2008/0250398 A1    Oct. 9, 2008

(30) Foreign Application Priority Data

Apr. 4, 2007    (JP)    ............................. 2007-098848

(51) Int. Cl.
*G06F 17/30* (2006.01)
(52) U.S. Cl. ......................................... 707/702; 707/809
(58) Field of Classification Search ................. 707/702, 707/809
See application file for complete search history.

(56) References Cited

U.S. PATENT DOCUMENTS

| | | | | |
|---|---|---|---|---|
| 6,240,091 B1 * | 5/2001 | Ginzboorg et al. | ......... | 370/401 |
| 6,275,790 B1 * | 8/2001 | Yamamoto et al. | ............. | 704/8 |
| 6,389,460 B1 * | 5/2002 | Stewart et al. | ............. | 709/217 |
| 6,721,286 B1 * | 4/2004 | Williams et al. | ............. | 370/282 |
| 6,735,759 B1 * | 5/2004 | Yamamoto et al. | .......... | 717/136 |
| 6,973,481 B2 * | 12/2005 | MacIntosh et al. | .......... | 709/206 |
| 7,000,072 B1 * | 2/2006 | Aisaka et al. | ............... | 711/118 |
| 7,194,072 B2 * | 3/2007 | Gamble | ................ | 379/102.03 |
| 7,287,018 B2 * | 10/2007 | Lennon | ...................... | 707/694 |
| 7,363,495 B2 * | 4/2008 | Felt et al. | .................... | 713/170 |
| 7,383,508 B2 * | 6/2008 | Toyama et al. | ............. | 715/723 |
| 7,475,060 B2 * | 1/2009 | Toyama et al. | ..................... | 1/1 |
| 2004/0044655 A1 | 3/2004 | Cotner et al. | | |

FOREIGN PATENT DOCUMENTS

JP    2003-099428    4/2003

* cited by examiner

*Primary Examiner*—James Trujillo
*Assistant Examiner*—Jorge A Casanova
(74) *Attorney, Agent, or Firm*—Patents On Demand PA; Brian K. Buchheit

(57) ABSTRACT

An assigning unit included in a device assigns an ID to a verification-target character string. A mapping file creating unit creates a mapping file in which the ID is associated with location data that indicates a location of the verification-target character string. In addition, an encoding unit included in the device encodes the ID into a zero-width character string. A character-string concatenating unit concatenates the zero-width character string to the verification-target character string. Furthermore, a decoding unit included in the device decodes the zero-width character string to the ID in response to selection of the verification-target character string displayed by a verification-target character string output unit. An extracting unit extracts the location data from the mapping file on the basis of the decoded ID. A mapping data output unit included in the device displays the mapping data including the extracted location data.

19 Claims, 12 Drawing Sheets

FIG. 4
(a)
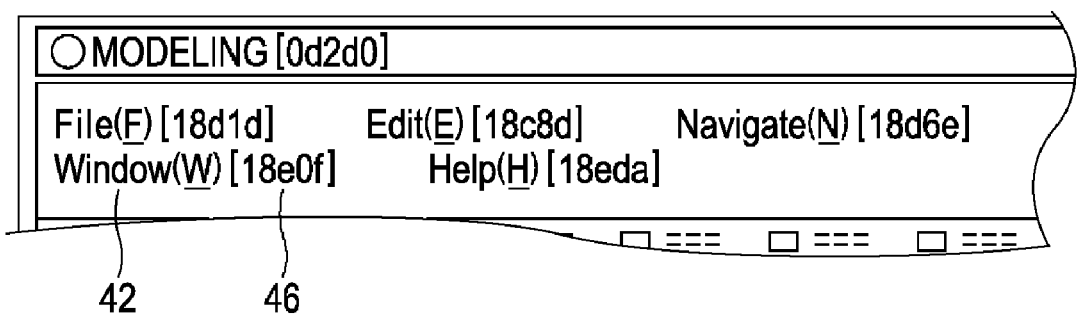
(b)
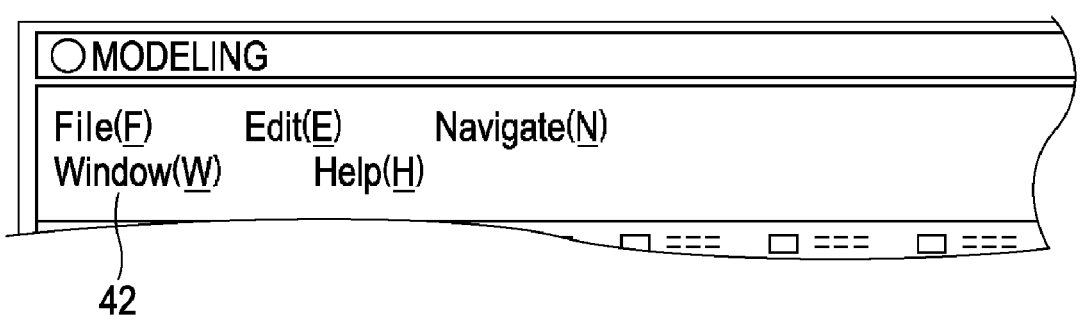

FIG. 5

IN CASE THAT ID IS INTEGER OF 3287,

1. DECIDE RADIX (SUCH AS, 10, 16, OR 32), PERFORM RADIX TRANSFORMATION
   IN ACCORDANCE WITH RADIX (IN EXAMPLES, "," SERVES AS DIGIT SEPARATOR)

IF RADIX = 10, 3; 2; 8; 7
   IF RADIX = 16, 12; 13; 7
   IF RADIX = 32, 3; 6; 23

2. LINE AS MANY CHARACTERS AS SPECIFIED BY VALUE OF EACH DIGIT
   (LINE AS MANY DIGIT SEPARATING CHARACTERS AS VALUE INDICATING RADIX AT THE TOP)
   FORMAT: <START CHARACTER><DIGIT × VALUE><DIGIT SEPARATOR × RADIX><DIGIT × VALUE>
   (<DIGIT SEPARATOR><DIGIT × VALUE>)*<END CHARACTER>

IF A = DIGIT CHARACTER, B = DIGIT SEPARATING CHARACTER, C = START AND END CHARACTER,

3287 => CBBBBBBBBBBAAABAAABAAAAAAABAAAAAABAAAAAAAC
           _____/   \_/  \_/   _____/    _____/
               10         3    2        8            7

(ZERO-WIDTH CHARACTER CODE IS USED FOR ALL OF A, B, C)

DEVICE, METHOD, AND COMPUTER PROGRAM PRODUCT FOR OUTPUTTING STORAGE LOCATION OF VERIFICATION-TARGET CHARACTER STRING

CROSS-REFERENCE TO RELATED APPLICATIONS

This application claims the benefit of Japanese Patent Application No. 2007-98848 filed 4 Apr. 2007, which is hereby incorporated by reference.

BACKGROUND OF THE INVENTION

The present invention relates to devices, methods, and computer program products for outputting a storage location of a verification-target character string to be output by software.

In this day of advanced computer technologies, software products including general-purpose software products are created and used in various countries around the world. For example, in the case that a software product is created in an English speaking country, user interfaces are generally displayed in English. In another country, such as Japan user interfaces are generally displayed in another language, namely, Japanese. When text is displayed in a language not familiar to a user that user interface can be difficult for the user to utilize. Accordingly, a mechanism to allow user interfaces to be displayed in other languages is employed.

A translation file in which a source language used by a software product is translated into another language is created in advance, and the software product uses this translation file, whereby this mechanism allows user interfaces to be displayed in other languages. With such a mechanism, it is possible to display user interfaces in other languages simply by preparing translation files compatible with the software product for every language, which thus permits the software product itself to be used generally. In many cases, this translation file is created not by software creators but by translators. However, translators do not necessarily have knowledge about a software product, translation of which the translators are in charge of, nor the translators do not necessarily know the software product well. For this reason, there is the reality that errors are often made in translation.

Such errors in translation are discovered by people who actually perform a test for a software product, also referred to as testers. Upon discovering an error in translation, the testers inform translators of a location and a content of the error, and the translators then modify the error in the software product. Complex software programs can include multiple translations files, which produce the "translated" text. When the size of the translations files becomes relatively large, a substantial amount of time can be spent discovering which translation files are responsible for which user interface translations. For example, there are 1500 or more translation files per language in IBM Rational Software Development Platform (SDP) version 6. It takes a significantly long time for both testers and translators to identify a translation file, among these translation files, corresponding to a user interface whose translation is determined as a mistranslation.

BRIEF SUMMARY OF THE INVENTION

According to a first embodiment of the present invention, a device for outputting a storage location of a verification-target character string to be output by software is provided. The device includes a controlling section, an input section, and a display section. An assigning unit assigns an ID to each verification-target character string. The ID may be any uniquely-determined code, such as, for example, a serial number starting from 1. Preferably, the ID may be an integral value. A mapping file creating unit then creates a mapping file in which the assigned ID is associated with location data regarding a text resource file including the verification-target character string. The text resource file is a resource file in a text format, and is referred to by the software. For example, the text resource file corresponds to a property file of Java® and an rc file (resource script file) of Windows®. The location data corresponds to a location (an absolute path of a file including a directory) of the text resource file including the retrieval-target character string and a location of the retrieval-target character string in the text resource file. For example, the location information indicates a key corresponding to the retrieval-target character string and the line number at which the retrieval-target character string is written. An encoding unit then encodes the ID into a zero-width character string invisible to users. A character-string concatenating unit then concatenates the encoded zero-width character string to the verification-target character string, corresponding to the ID, included in the text resource file. To concatenate means that the encoded zero-width character string is written continuously to follow the verification-target character string, which may be realized by updating the original text resource file or by creating a new text resource file. A verification-target character string output unit then outputs the verification-target character string including the zero-width character string on the display section using the text resource file. In response to reception of a verifier's input of selecting the displayed verification-target character string including the zero-width character string from the input section, a decoding unit decodes the encoded zero-width character string into the ID. An extracting unit then extracts the location data from the mapping file on the basis of the decoded ID. Lastly, a mapping data output unit outputs mapping data including the extracted location data on the display section.

According to a second embodiment of the present invention, the encoding of the ID into the zero-width character string is performed using a character control code that is not displayed on a screen. The character control code means a character code that controls, for example, displaying of characters in existing character codes, such as Unicode and EUC (Extended Unix Code). Additionally, the encoding unit encodes the ID on the basis of a radix, which is a predetermined integral value. By previously determining the radix, description regarding the value of the radix is omitted from the number of characters used in the encoding, which thus can minimize the number of characters. Alternatively, the encoding unit may decide a radix according to the value of the ID, which is an integral value, and encodes the ID on the basis of the decided radix. In this case, the encoded ID includes a start character that indicates a start of a character string, a digit separating character that is repeated as many times as the value of the radix, a digit character that is repeated as many times as a value of each digit, and an end character that indicates an end of the character string. The digit separating character is inserted in front of the repeated digit characters as a character that indicates a separation of each digit. With such a configuration, the radix can be optimized based on the value of the ID. Furthermore, by using the same character for the start character and the end character, the ID can be encoded while suppressing kinds of character code used in the encoding.

According to a third embodiment of the present invention, the text resource file is stored in the device or an external storage device connected to the device via a network. In addition, the text resource file includes a key corresponding to the verification-target character string. The controlling section of the device includes a retrieving unit for retrieving another text resource file having the same key as the key corresponding to the verification-target character string. In response to reception of the verifier's input of selecting from the input section, the display section displays property information of the text resource file in comparison with property information of the retrieved other text resource file. Alternatively, the device or the external storage device stores a correspondence file including another character string to be output by the software and a key corresponding to the other character string. The display section displays property information of the text resource file in comparison with property information of the correspondence file having the same key as the text resource file.

According to a fourth embodiment of the present invention, the display section further displays a program module that is invoked by the software and that uses the text resource file. The program module is a computer program that loads the text resource file, and corresponds to, for example, a class file in the case of Java®. In addition, the verification-target character string output unit outputs the verification-target character string including the zero-width character string on the display section by activating verification software. A key operation used by the verifier to input the selection is assigned from key operations that are not pre-assigned to operations of the verification software. With such a configuration, the verifier can display the mapping data with a simple operation upon discovering an error in the character string while verifying normal operations of the software. In addition, the display section may display a graphical user interface included in the software. With such a configuration, users can easily obtain desired information at a glance. In addition, the verification-target character string may include a translated character string. With such a configuration, the present invention can be applied to errors in translation.

In addition, as other aspects, the present invention can be also provided as a method or a computer program executed in a computer.

BRIEF DESCRIPTION OF THE SEVERAL VIEWS OF THE DRAWINGS

FIG. 4 is a diagram showing differences displayed on GUI screens depending on methods of encoding an ID.

FIG. 5 is a diagram showing a method for encoding an ID to create an encoded ID invisible to users.

DETAILED DESCRIPTION OF THE INVENTION

The present invention provides devices, methods, and computer program products for outputting a storage location of the character string when an error in a character string is discovered. One application of the invention can assist in a discovery of a translation file related to an erroneously translated interface control. The invention is not limited to any specific context, however, and can be used in any circumstances to discover a source file from which a string was generated.

In one embodiment, a mapping file in which location data of a retrieval-target character string in a text resource file is associated with an ID is created. In the text resource file, the ID is concatenated to the retrieval-target character string. Accordingly, when a user discovers, for example, a mistranslated message, the user can identify the location in which the message is written on the basis of the ID concatenated to the retrieval-target character string using the mapping file. Thus, the user can easily trace a location in a file where the mistranslated message is written.

In another embodiment, the ID can be encoded into a zero-width character string invisible to users, and is concatenated to the retrieval-target character string. Accordingly, displayed screen is not changed even if the ID is appended. Thus, it is possible to append the ID without decreasing the operability of activated software.

In still another embodiment, it is possible to encode an ID using fewer kinds of character code by converting the ID according to a radix in an ID encoding method. Accordingly, a function of the present invention can be realized by preparing minimum kinds of character codes used in a zero-width character string invisible to users. Additionally, it is possible to encode the ID using an optimum radix by deciding the radix according to the value of the ID.

Figure 1:
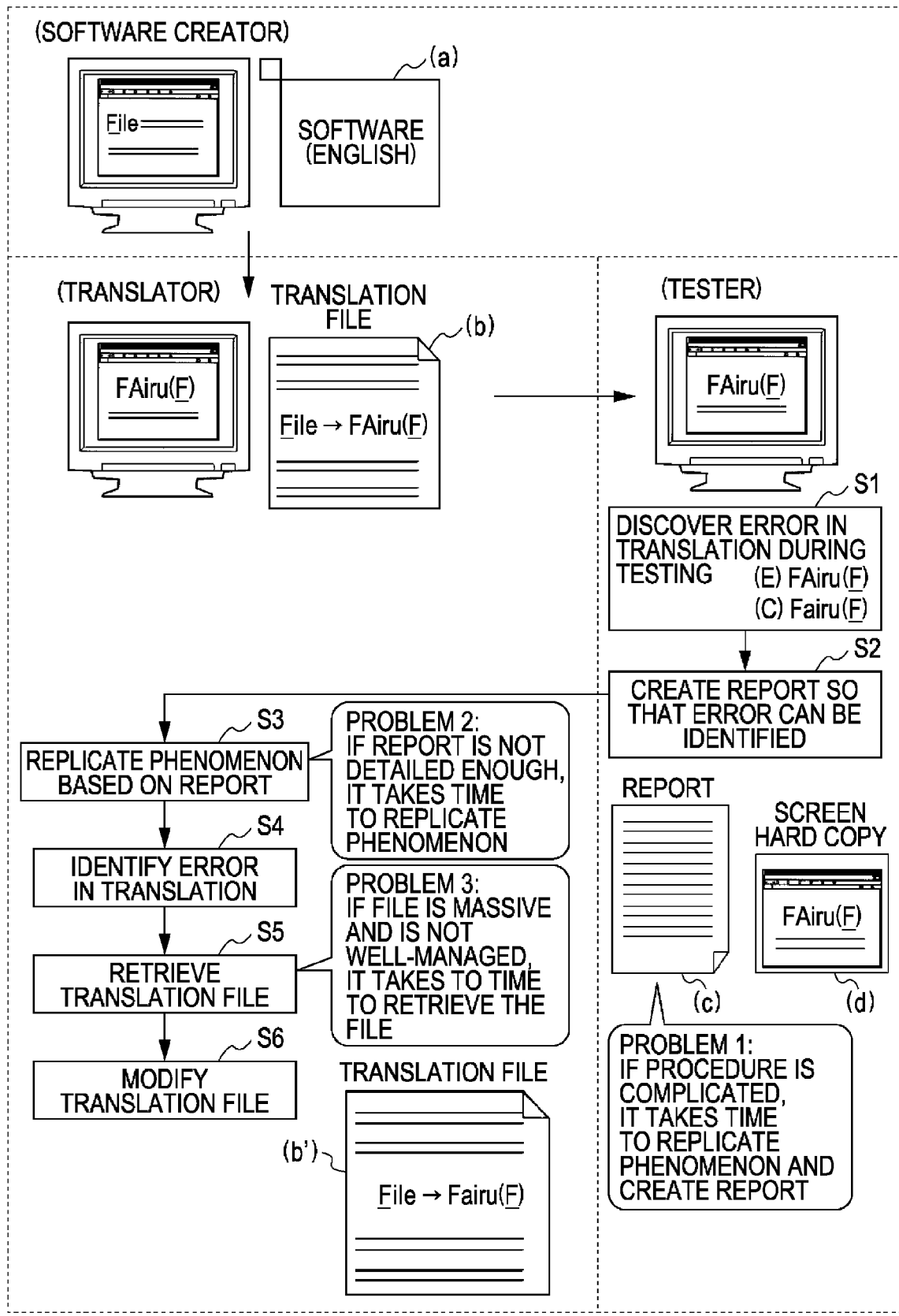
FIG. 1 (Prior Art) is a diagram showing an outline of a traditional flow of modifying an error in translation regarding a software product.

FIG. 1 (Prior Art) is a diagram showing an outline of a traditional flow of modifying an error in translation regarding a software product.

Firstly, a software creator creates software. The created software displays user interfaces, for example, in English ((a) of FIG. 1). Next, a translator creates a translation file. The translation file is a text resource file that allows, for example, English user interfaces of software to be displayed in Japanese, and in which character strings used by the software are associated with keys for the character strings. An example shown by (b) of FIG. 1 shows a case where a part to be displayed as a user interface "File" is displayed as "FAiru(F)" using a translation file.

After the translator creates the translation file, a tester then performs a test for confirmation of operations of software and confirmation of display. In this example, "Fairu" is displayed as "FAiru" due to an error in creating the translation file, and a capital letter "A" is wrong. Upon discovering such an error in translation during the test in this manner (S1), the tester creates a report so that the error can be identified (S2). In the report, a procedure is described step by step in a report format so that a location of the discovered error can be identified, for example ((c) of FIG. 1). In addition, a screen hard copy ((d) of FIG. 1) is acquired if necessary.

As a problem that may be caused at this time, it may take a time for the tester to replicate the phenomenon when the procedure of causing the error is complicated. In addition, there is a problem that it takes a time for the tester to create a report for describing the replicated content in detail when the procedure of causing the error is complicated.

After the tester gives the translator a document, such as the report and the screen hard copy if necessary, for identifying the error, the translator replicates the phenomenon according to the received report in order to identify the phenomenon and the location of the error (S3). At this time, there is a problem that the translator cannot replicate the phenomenon of the error, or that it takes a time to replicate the phenomenon if the report created by the tester at S2 described above is not detailed enough for the replication.

After identifying the error in translation by the replication (S4), the translator retrieves a translation file in which the error is written from a location at which the translation file is stored (an absolute path of the file including a directory) (S5). At this time, there is a problem that it takes a time for the translator to retrieve the translation file if the number of translation files is vast or the translation files are not well managed.

After retrieving the translation file, the translator modifies the translation file (S6). Here, the translator modifies a capital letter to a small letter "a" so as to correct a translation for "File" in the translation file from "FAiru(F)" to a proper translation "Fairu(F)" ((b') of FIG. 1). By means of a series of processing flows, a translator can modify errors in translation discovered by a tester.

Figure 2:
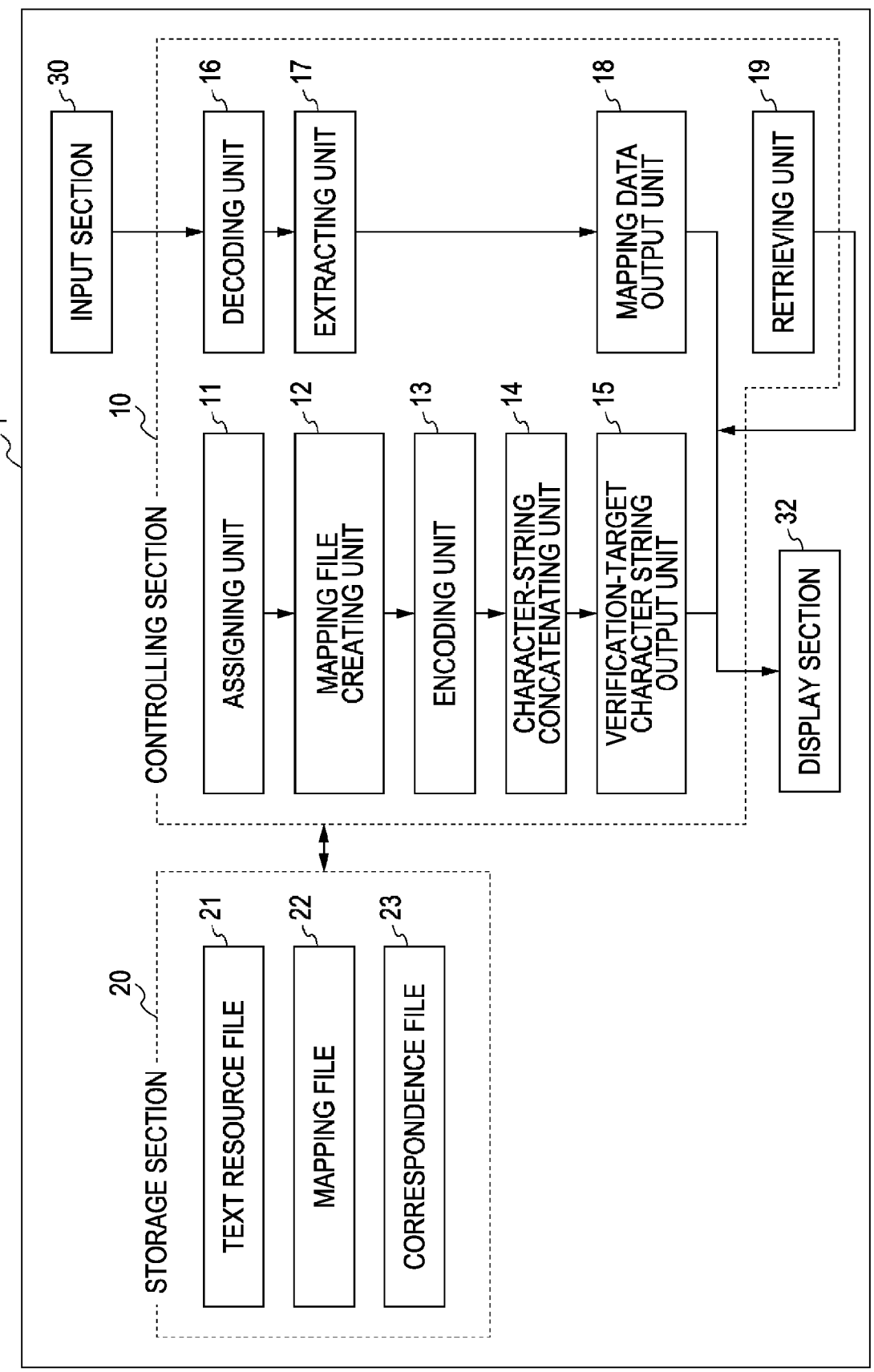
FIG. 2 is a diagram showing an example of a configuration of a device according to an embodiment of the present invention.

FIG. 2 is a diagram showing an example of a configuration of a device 1 according to an embodiment of the present invention. The device 1 mainly includes a controlling section 10, a storage section 20, an input section 30, and a display section 32. The controlling section 10 mainly includes an assigning unit 11, a mapping file creating unit 12, an encoding unit 13, a character-string concatenating unit 14, a verification-target character string output unit 15, a decoding unit 16, an extracting unit 17, a mapping data output unit 18, and a retrieving unit 19. In addition, the storage section 20 includes a text resource file 21 and a mapping file 22. The storage section 20 may further include a correspondence file 23. In this embodiment, description is given while it is assumed that the text resource file 21 is stored in the storage section 20. However, the configuration is not limited to this, and the text resource file 21 may be stored in an external storage device connected to the device 1 via a network.

The text resource file 21 is a file in which verification-target character strings to be output by software are associated with keys, corresponding to the verification-target character strings, to be retrieved on the software side. The assigning unit 11 assigns an ID to each verification-target character string. In addition, the mapping file creating unit 12 creates a mapping file 22 in which a storage location (an absolute path of a file including a directory) of the text resource file 21 in the storage section 20 and a location of a key in the text resource file 21 are associated with the assigned ID. The mapping file creating unit 12 then stores the mapping file 22 in the storage section 20. The encoding unit 13 encodes an ID into a zero-width character control code invisible to users. The character-string concatenating unit 14 appends the encoded zero-width character control code to a verification-target character string included in the text resource file 21. Alternatively, the character-string concatenating unit 14 may newly create a text resource file.

The verification-target character string output unit 15 outputs a GUI (graphical user interface) screen data including a verification-target character string on the display section 32 by activating verification software for verifying errors in translation or the like of a software product. The verification software is software used by a tester, for example. The verification software loads the text resource file 21 including the encoded zero-width character control code, and starts operating.

In response to a tester's input for selection supplied from the input section 30, the decoding unit 16 decodes the encoded zero-width character control code appended to the selected verification-target character string in the text resource file 21 to acquire the original ID. The extracting unit 17 retrieves location data corresponding to the ID from the mapping file 22 on the basis of the decoded ID to extract the location data. The mapping data output unit 18 outputs mapping data including property information, such as the location data and the key, on the display section 32.

The retrieving unit 19 retrieves other text resource files 21 having the same key as that corresponding to the verification-target character string. Meanwhile, it is possible to perform similar processing by using the correspondence file 23 without performing this retrieval. The correspondence file 23 is a file corresponding to the text resource file 21, and includes other character strings to be output by software and keys corresponding to the other character strings. More specifically, for example, contents to be displayed on GUIs are written in Japanese in the text resource file 21, whereas contents to be displayed on GUIs are written in English in the correspondence file 23.

Figure 3:
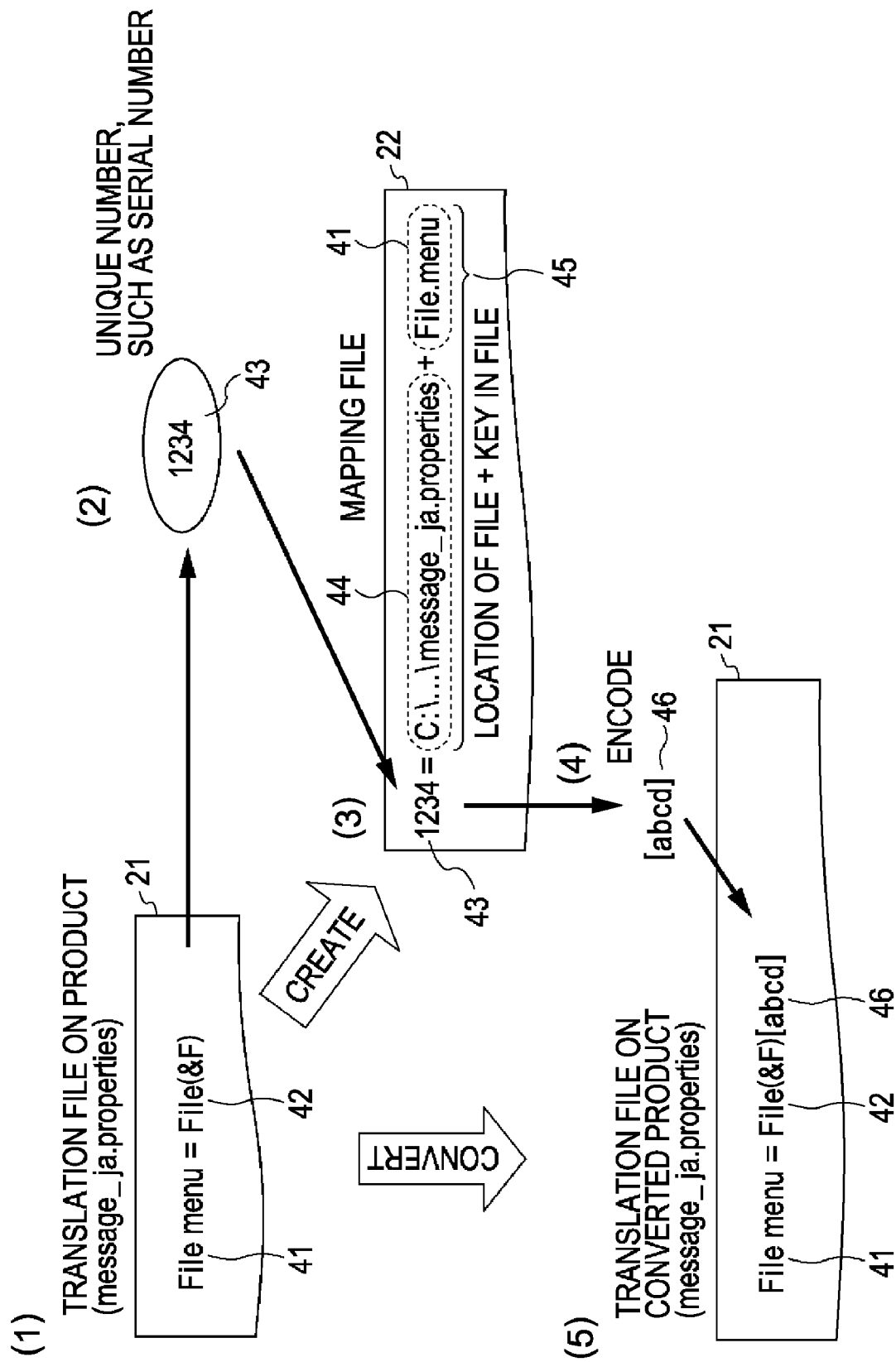
FIG. 3 is a diagram showing an example of rewriting a text resource file.

FIG. 3 is a diagram showing an example of rewriting the text resource file 21. Here, a translation file on a product is shown as an example of the text resource file 21. In addition, in this example, a property file that is a translation file used by software created in Java® is used. Furthermore, a series of processing steps shown in FIG. 3 is performed by the controlling section 10 of the device 1.

Firstly, at (1) shown in the upper left part of FIG. 3, a property file having a name of "message_ja.properties" is prepared as a translation file on the software product. According to FIG. 1 described above, for example, a translator creates this file. In the property file, a key name 41 of "File.menu" and a retrieval-target character string 42 of "Fairu (&F)" are associated with each other by "=" and stored. "(&F)" in the retrieval-target character string 42 is for displaying a character "F" as an underlined character "(F)" on a GUI screen. The underlined character "(F)" indicates that "File" in a tool bar is selectable, for example, by pressing a key "F" while pressing an "Alt key".

Next, at (2) shown in the upper right part, the controlling section 10 assigns an ID 43 represented by a unique number, such as a serial number, to the retrieval-target character string 42. In the example of (2), a number "1234" is assigned as the ID 43. Then, at (3), the controlling section 10 creates the mapping file 22 in which location data 45, constituted by a file location 44 of the translation file and a key name 41 included in the translation file, is associated with the ID 43. This example shows that the translation file "message_ja.properties" is stored in a folder existing in a C drive of the device 1 and the key name 41 of "File.menu" included in the translation file is associated with the location by the ID 43 of "1234". In addition, in this example case, the key name 41 is used as a key included in the file. However, the key is not limited to this example, and any key, such as a line number in the file, which can identify a location at which the retrieval-target character string 42 corresponding to the ID 43 exists, can be used. Next, at (4), the controlling section 10 encodes the ID 43 of "1234" into an encoded ID 46 of "[abcd]". Meanwhile, "[" and "]" represent a start character and an end character, respectively. Lastly, at (5) shown at the lower left part, the controlling section 10 concatenates the encoded ID 46 to the retrieval-target character string 42 included in the translation file. By means of this series of processing steps, the translation file in which the key name 41 is associated with the retrieval-target character string 42 is converted into a translation file in which the key name 41 is associated with a concatenated character string of the retrieval-target character string 42 and the encoded ID 46.

FIG. 4 is a diagram showing differences displayed on GUI screens depending on methods of encoding the ID 43. FIG. 4(a) shows a case that the encoded ID 46 is encoded with a normal character code, whereas FIG. 4(b) shows a case that the encoded ID 46 is encoded with a special zero-width character control code.

Firstly, in FIG. 4(a), the encoded ID 46 is assigned to a character string translated as the retrieval-target character string 42 through the above-described processing shown in FIG. 3. The encoded ID 46 is appended to the retrieval-target character string 42. When the encoded ID 46 is represented by a normal character code as shown in the example of FIG. 4(a), the encoded ID 46 is displayed on a GUI screen as enumerated alphanumeric characters. For this reason, the displayed screen is untidy, and becomes an unbalanced inconspicuous screen. In addition, spaces for the displayed character strings are occupied because the encoded ID 46 is displayed, which changes the arrangement of the GUI screen. Depending on circumstances, the retrieval-target character string 42 may protrude from the screen, which may cause a problem that a tester cannot select the retrieval-target character string 42.

On the other hand, in the case of FIG. 4(b), a zero-width character code is used in the encoded ID 46. Accordingly, character strings do not appear on a GUI screen even if the encoded ID 46 is appended to the retrieval-target character string 42. Since an appearance of the GUI screen is not changed unlike the above-described case of FIG. 4(a) while the ID 43 indicating the location in the mapping file 22 is appended as a data, the problem that the retrieval-target character string 42 may protrude from the screen is not caused.

FIG. 5 is a diagram showing a method for creating the encoded ID 46 invisible to users by encoding the ID 43. Here, a case that the ID 43 is an integral value of "3287" will be described as an example.

Firstly, the controlling section 10 decides a radix on the bases of the value of the ID 43. The radix may be a fixed value pre-decided in the device 1. Alternatively, an optimum radix may be decided according to the value of the ID 43. Here, a case that the radix that is not pre-decided but is decided according to the value of the ID 43 is described. The controlling section 10 performs radix transformation on the value of the ID 43 according to the decided radix. For example, if the radix is 10, "3287" can be represented as "3; 2; 8; 7" (";" serves as a digit separator). If the radix is 16, "3287" can be represented as "12; 13; 7".

The controlling section 10 then repeatedly places as many characters as a value of each digit to encode the ID 43. At this time, the controlling section 10 first places a start character indicating the start of a character string, and then repeatedly places a digit separating character as many times as the value of the radix. The controlling section 10 then repeatedly places a digit character as many times as the value of each digit. The digit separating character is placed between values of each digit. The controlling section 10 lastly places an end character indicating the end of the character string. As shown in FIG. 5, in the case that the radix is set to 10, "3287" can be represented as "CBBBBBBBBBBAAABAABAAAAAAAABAAAAAAAC" with this operation, where A, B, and C indicate specific character codes. Additionally, in this example, the same character is used as the start character and the end character. However, the start and end characters are not limited to this example, and can be represented by different character codes.

What is to be considered at this time is that zero-width character codes invisible to users are used for characters used in the encoding. If zero-width character codes are not used, a screen may be unimpressive one as shown in FIG. 4(a). In addition, the operationality of the activated software may be decreased due to changes in a displayed screen. For example, character codes of Unicode can be used in the encoding. Unicode is a character code system standardized by International Organization for Standardization (ISO), and is a character code that represents each character using 16 bits. Among the character codes of Unicode, Zero-Width Space (hereinafter, referred to as ZWSP) whose character code is U+200B, Zero-Width Non-Jointer (hereinafter, referred to as ZWNJ) whose character code is U+200C, and Zero-Width Jointer (hereinafter, referred to as ZWJ) whose character code is U+200D can be used. For example, ZWSP is originally used between English words, and is a character code that controls line feeding. Although these character codes described above are characters that controls displaying, which is the original usage, these character codes are used in a usage different from the original one. However, since the zero-width character codes are appended to the retrieval-target character string 42 and used at the end of the character string, the zero-width character codes do not affect the software.

Although an encoding operation using Unicode has been described in this example, this function can be realized by using any other character codes as long as the character codes are those similarly invisible to users and the usage thereof does not affect the software.

Figure 6:
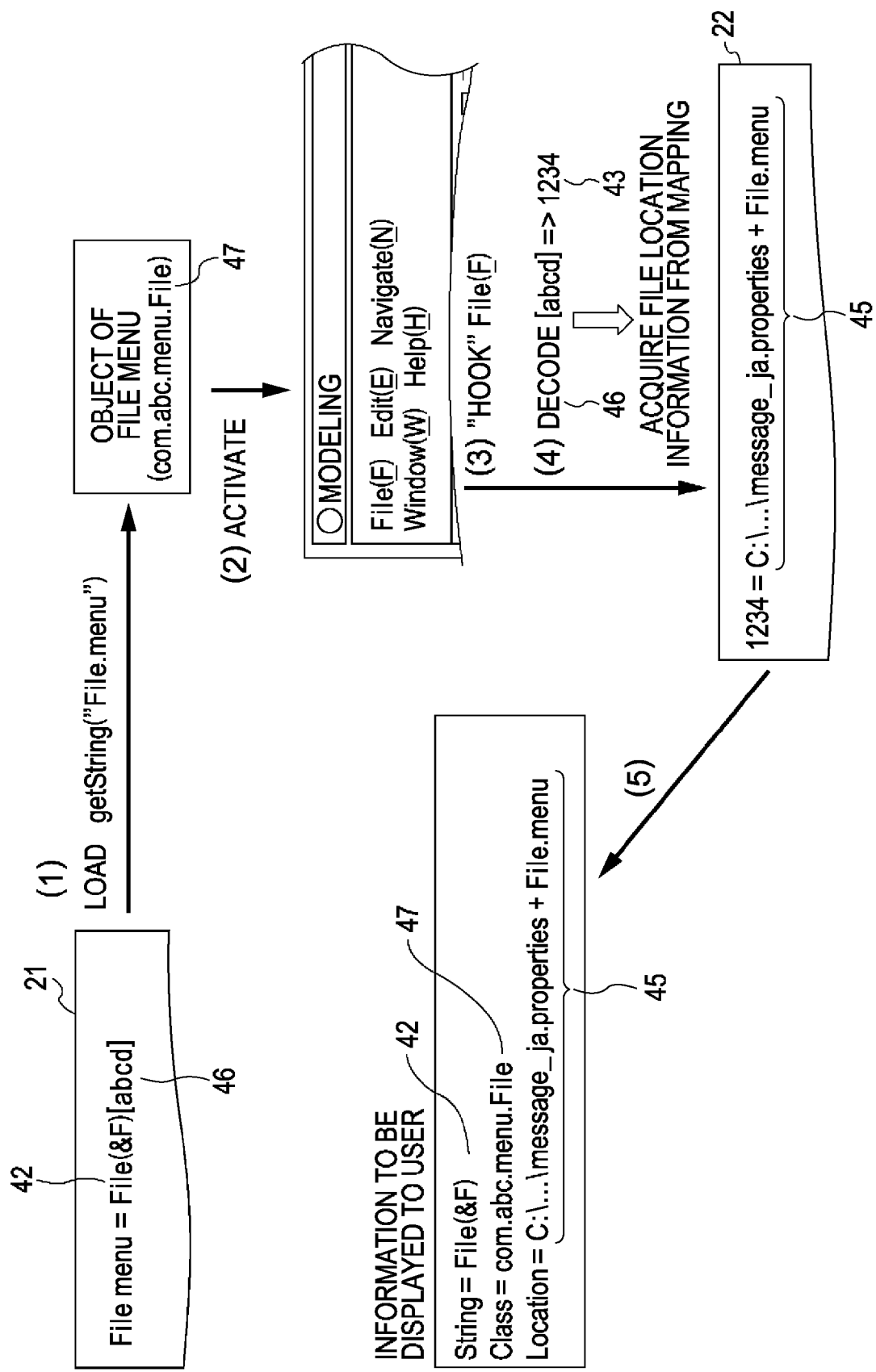
FIG. 6 is a diagram showing a series of states of retrieving mapping on the basis of a retrieval-target character string and displaying a location on a user interface.

FIG. 6 is a diagram showing a series of states of retrieving mapping on the basis of retrieval-target character string 42 and displaying the location data 45 on a user interface.

As shown at upper left of FIG. 6, an object 47 of a file menu of software loads the updated text resource file 21 in which the encoded ID 46 is appended ((1) of FIG. 6). The object 47 is then activated ((2) of FIG. 6), and a file menu screen is displayed. Since the encoded ID 46 is encoded with the above-described character codes invisible to users, no encoded characters are displayed on the displayed file menu screen.

If a tester, namely, a user, "hooks", for example, a place at which "File(F)" is displayed at (3), the controlling section 10 decodes the encoded ID 46 appended to "File(F)" ((4) of FIG. 6). The controlling section 10 acquires the file location data 45 from the mapping file 22 using the decoded ID 43 as the key. Meanwhile, "to hook" means an input operation performed on a key or a mouse to perform processing for realizing this function by storing an action not assigned in the normal software in association with a key or mouse operation.

Lastly, the controlling section 10 acquires information to be displayed to the tester, namely, the user, on the basis of the decoded ID 43 ((5) of FIG. 6). The information to be displayed to users corresponds to the retrieval-target character string 42 and the location data 45 of the text resource file 21. The object 47 that loads the retrieval-target character string 42 can be also displayed.

Figure 7:
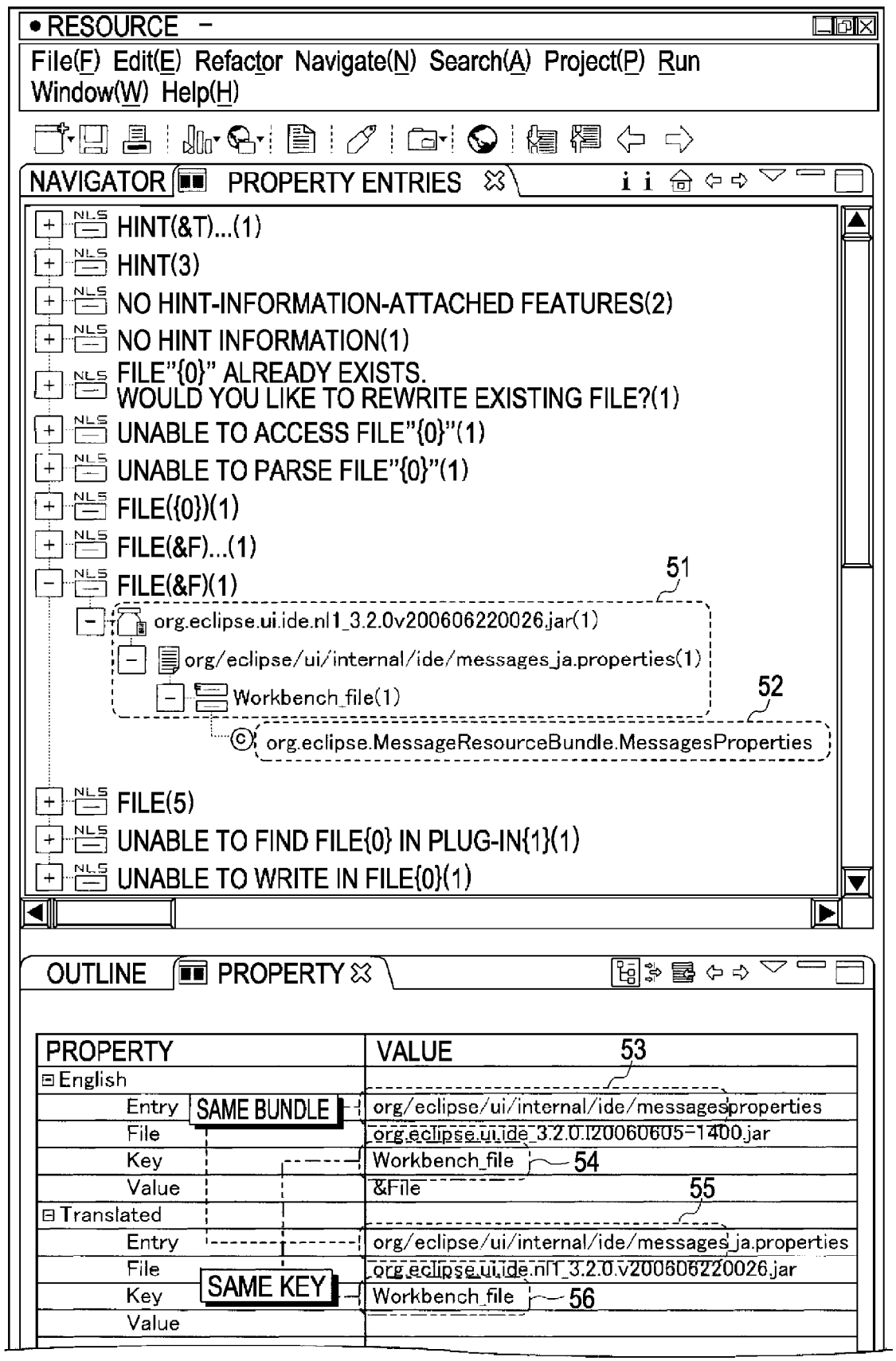
FIG. 7 is a diagram showing an example of a display screen that displays location data of a text resource file to testers.

FIG. 7 is a diagram showing an example of a display screen that displays the location data 45 of the text resource file 21 to testers. At an upper part of the screen, information on a property file location 51 and an object 52 is displayed as property entries, for example, in the explorer format, so that the directory hierarchy can be known. The property file location 51 shows a property file name and a key name 56 of a translation file, i.e., the text resource file 21. In addition, the object 52 shows an object name that uses the key name 56 in a format that the key name 56 of the property file location 51 is associated with the object 52.

In addition, the lower part of the screen shows a property screen. This property screen is displayed in response to selecting the property file in the property entries displayed at the upper part of the screen. In this example the property file is displayed in comparison with the original file. It is indicated that the original file is a file to be displayed in English as user interfaces. In addition, a bundle name 53 and a key name 54 of the original file are displayed in a format comparable with a bundle name 55 and a key name 56 of the translation file. By performing such a display method, information regarding original files corresponding to translation files can be displayed as a list. For example, an English character string can be simultaneously displayed as an interlingual correspondence.

Figure 8:
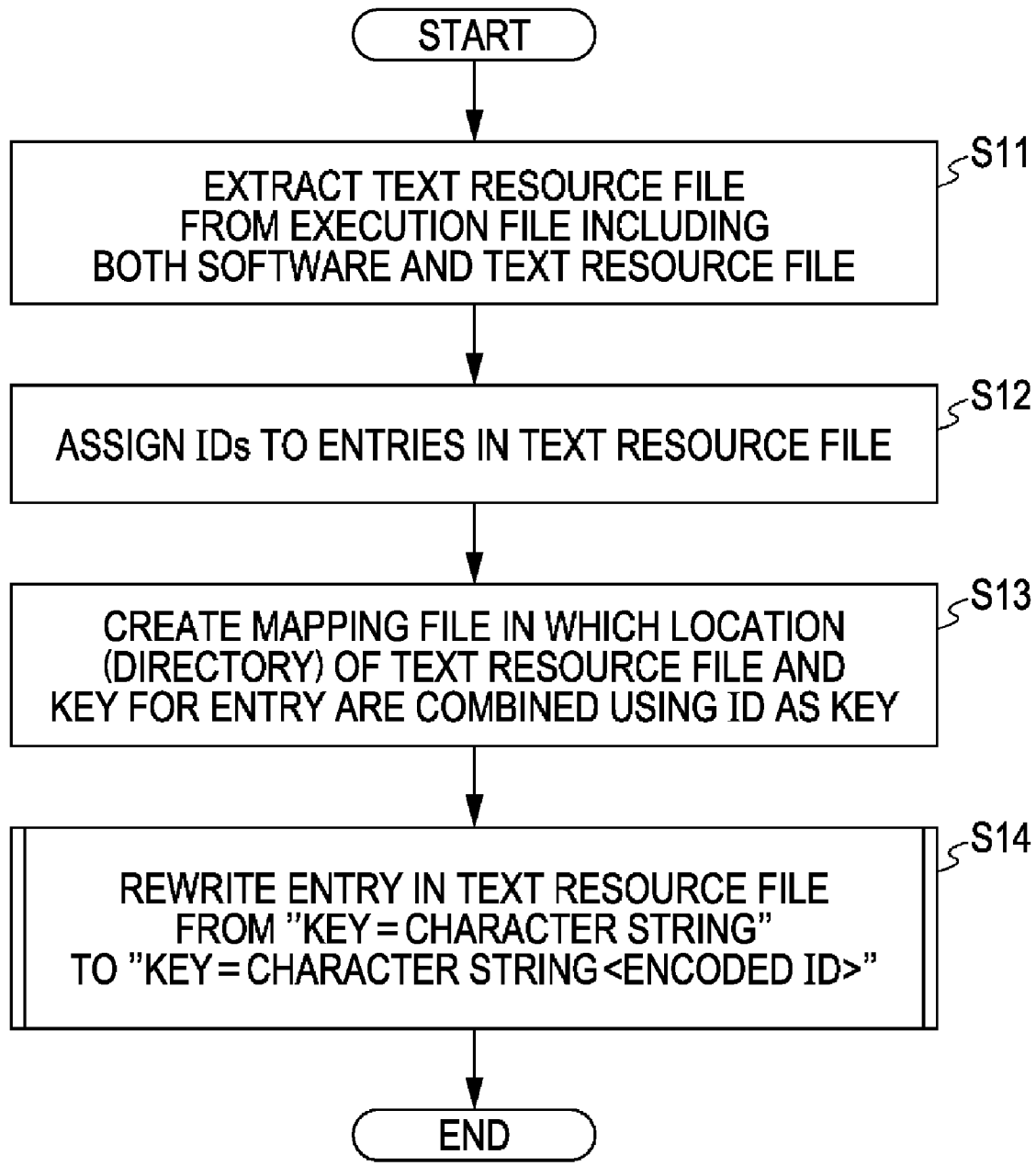
FIG. 8 is a flowchart showing an operation for rewriting a text resource file.

FIG. 8 is a flowchart showing an operation for rewriting the text resource file 21. This operation appends the encoded ID 46 to the retrieval-target character string 42 in the text resource file 21.

Firstly, at STEP S11, the controlling section 10 of the device 1 extracts the text resource file 21 from an execution file, which is a software product, and into which the main software code and the text resource file 21 are integrated. Originally, the software product is a product in which software and the text resource file 21 are built. Thus, it is necessary to extract the text resource file 21 by this operation. Thereafter, the controlling section 10 advances the operation to STEP S12.

Next, at STEP S12, the controlling section 10 (more specifically, the assigning unit 11) assigns the ID 43 to an entry (i.e., the retrieval-target character string 42) included in the text resource file 21. The assigned ID 43 is a number unique to each entry. Thereafter, the controlling section 10 advances the operation to STEP S13.

At STEP S13, the controlling section 10 (more specifically, the mapping file creating unit 12) creates the mapping file 22 in which the location (an absolute path of a file including a directory) of the text resource file 21 and a key of the entry (i.e., the retrieval-target character string 42) are associated using the ID 43 as the key. Thereafter, the controlling section 10 advances the operation to STEP S14.

At STEP S14, the controlling section 10 (more specifically, the encoding unit 13 and the character-string concatenating unit 14) rewrites the entry (i.e., the retrieval-target character string 42) included in the text resource file 21 from "key=character string" to "key=character string<encoded ID>". Thereafter, the controlling section 10 terminates this operation. Here, "<encoded ID>" indicates the encoded ID 46 is invisible to users. With this series of processing steps, the controlling section 10 rewrites the text resource file 21 and creates information for identifying entries (i.e., the retrieval-target character strings 42) in the rewritten text resource file 21 as the mapping file 22. This allows the location in the mapping file 22 to be determined on the basis of the retrieval-target character string 42 in an operation that will be described later.

Figure 9:
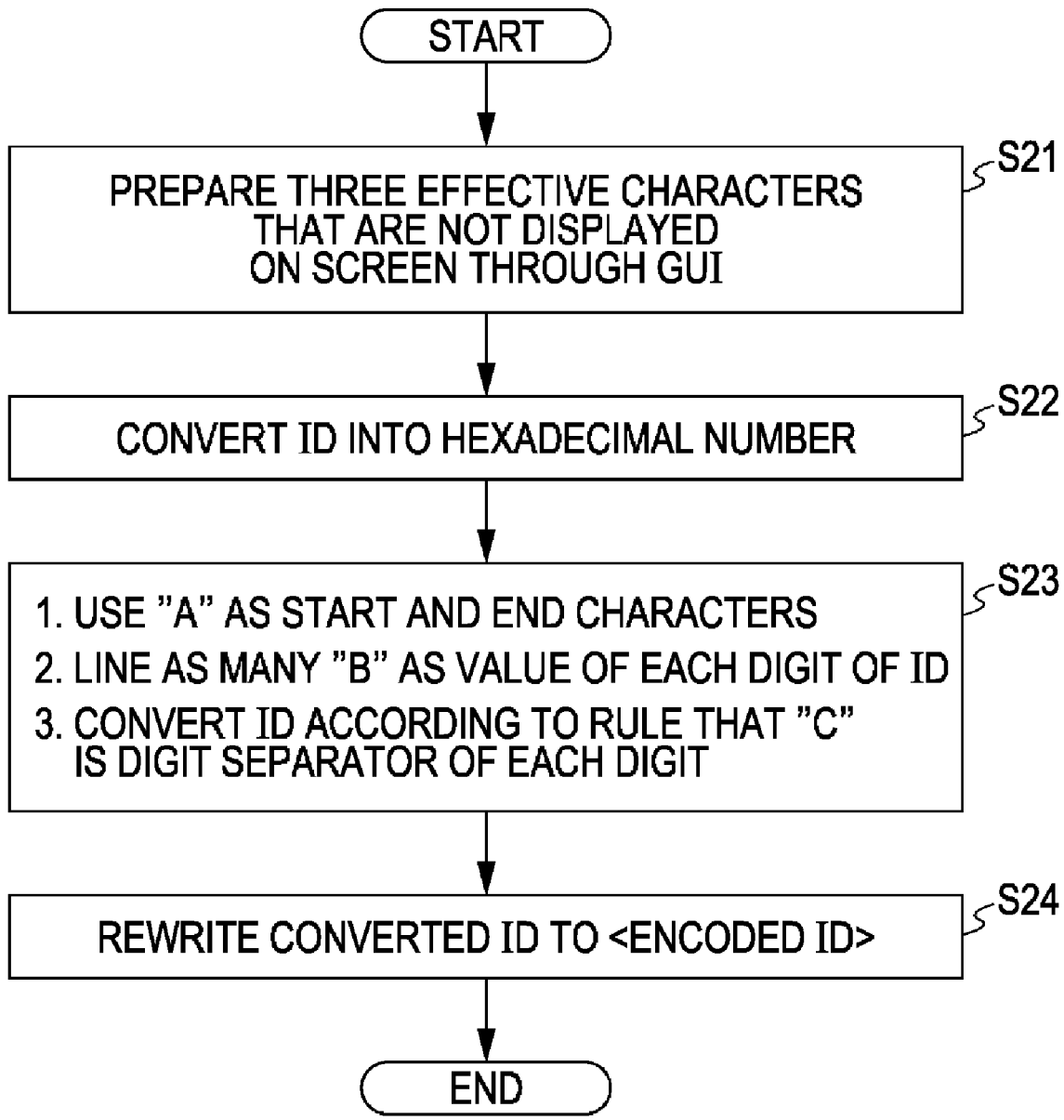
FIG. 9 is a flowchart showing an example of an operation for rewriting an encoded ID.
Figure 10:
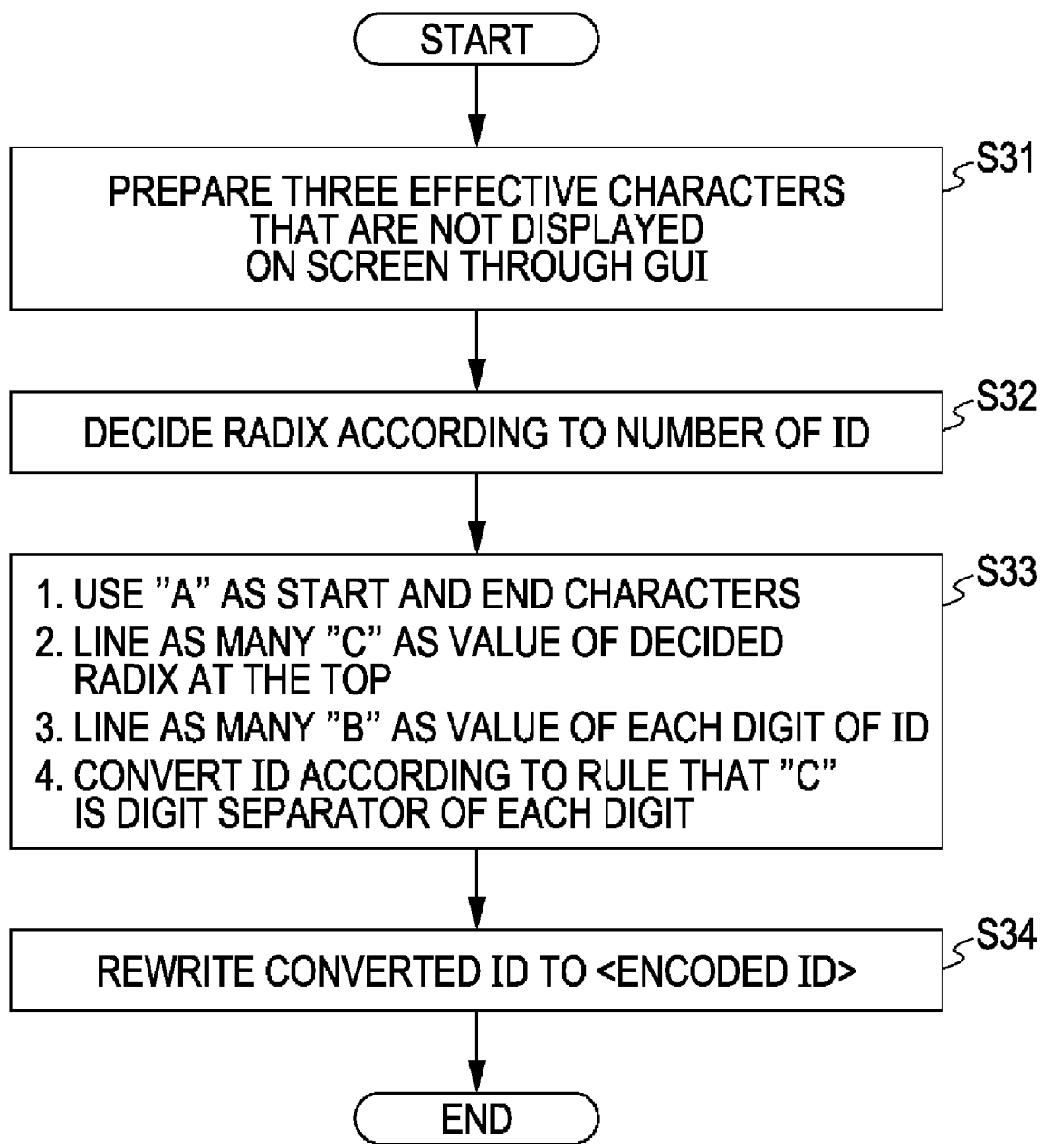
FIG. 10 is a flowchart showing an example of an operation for rewriting an encoded ID.

FIG. 9 and FIG. 10 are flowcharts showing an encoded ID rewriting operation, which is a part of processing performed at STEP S14 of FIG. 8. Herein, two operations regarding a case that a radix is predetermined and a case that a radix is determined according to a value of the ID 43 will be described as major encoded ID rewriting operations. Firstly, the case that the radix used for encoding is predetermined will be described on the basis of FIG. 9.

Firstly, at STEP S21, the controlling section 10 (more specifically, the encoding unit 13) prepares three kinds of characters that are effective as characters and that are not displayed on a screen through a GUI (graphical user interface). As described above, in the case of character codes of Unicode, for example, the controlling section 10 prepares character codes of ZWSP, ZWNJ, and ZWJ. Thereafter, the controlling section 10 (more specifically, the encoding unit 13) advances the operation to STEP S22.

At STEP S22, the controlling section 10 (more specifically, the encoding unit 13) converts the ID 43 into a hexadecimal number. Although the radix is set to 16 in this example, the radix may be any predetermined value. Thereafter, the controlling section 10 (more specifically, the encoding unit 13) advances the operation to STEP S23.

At STEP S23, the controlling section 10 (more specifically, the encoding unit 13) converts the ID 43 using a first character (herein, written as "A") from the three characters prepared at STEP S21 as start and end characters, a second character (herein, written as "B") as a digit character to be repeated as many times as the value of each digit of the ID 43, and a third character (herein, written as "C") as a digit separating character. More specifically, for example, in a case that the ID 43 is represented as "312" in a hexadecimal number system, "312" can be converted into "ABBBCBCBBA". Thereafter, the controlling section 10 advances the operation to STEP S24.

At STEP S24, the controlling section 10 (more specifically, the character-string concatenating unit 14) rewrites the encoded ID 46, namely, the converted ID, to <encoded ID>. Thereafter, the controlling section 10 (more specifically, the character-string concatenating unit 14) terminates this operation. Although one character is used as the start and end characters in this example, the start and end characters may be different characters. In such a case, another character that is not displayed on a screen has to be prepared.

The case that the radix used for encoding is decided according to the value of the ID 43 will be described next based on FIG. 10.

Firstly, at STEP S31, the controlling section 10 (more specifically, the encoding unit 13) prepares three kinds of characters that are effective as characters and that are not displayed on a screen through a GUI (graphical user interface). Thereafter, the controlling section 10 (more specifically, the encoding unit 13) advances the operation to STEP S32.

At STEP S32, the controlling section 10 (more specifically, the encoding unit 13) decides a radix according to a value of the ID 43. Thereafter, the controlling section 10 (more specifically, the encoding unit 13) advances the operation to STEP S33.

At STEP S33, the controlling section 10 (more specifically, the encoding unit 13) converts the ID 43 using a first character (herein, written as "A") from the three characters prepared at STEP S31 as start and end characters, a second character (herein, written as "B") as a digit character to be repeated as many times as the value of each digit of the ID 43, and a third character (herein, written as "C") as a digit separating character to be repeated, after the start character, as many times as the value of the decided radix. More specifically, for example, in a case that the ID 43 is represented as a decimal number of "342", "342" can be represented as "156" if the radix is set to 16. Thus, "342" can be converted into "ACCCCCCCCCCCCCCCCB-CBBBBBCBBBBBBA". Additionally, if the radix is set to 10, "342" can be converted into "ACCCCCCCCCCBBBCBBBBCBBA". Thereafter, the controlling section 10 advances the operation to STEP S34.

At STEP 34, the controlling section 10 (more specifically, the character-string concatenating unit 14) rewrites the encoded ID 46, namely, the converted ID, to <encoded ID>. Thereafter, the controlling section 10 (more specifically, the character-string concatenating unit 14) terminates this operation. Although one character is used as the start and end characters in this example as in the case of FIG. 9, the start and end characters may be different characters. In such a case, another character that is not displayed on a screen has to be prepared.

As described above, since the radix can be decided according to the value of the ID 43, this operation allows the ID 43 to be encoded into the encoded ID 46 using an optimum radix according to the value of the ID 43.

Figure 11:
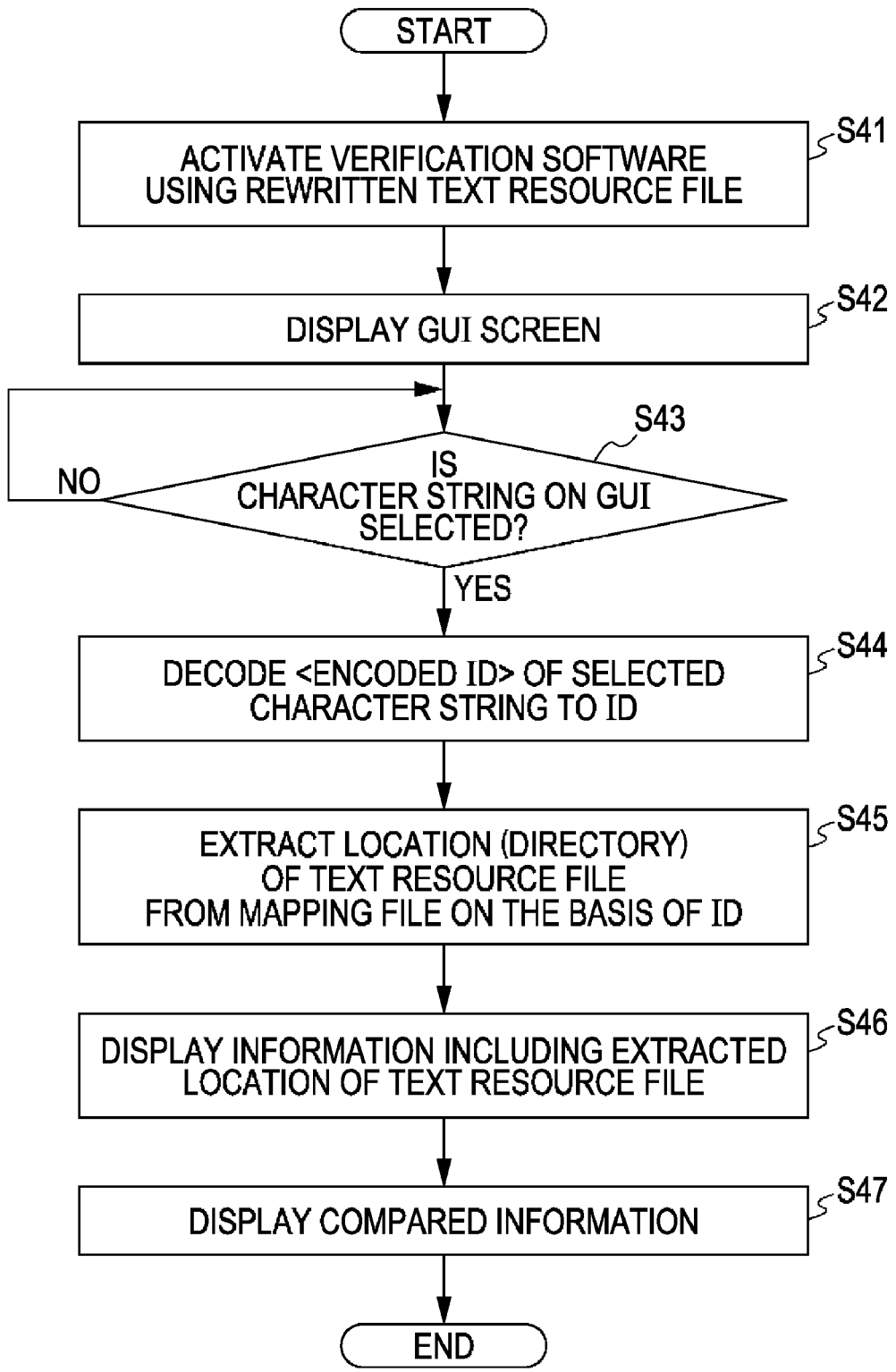
FIG. 11 is a flowchart showing an operation of verification software.

FIG. 11 is a flowchart showing an operation of verification software. This verification software is activated by a tester, namely, a user.

Firstly, at STEP S41, the controlling section 10 activates the verification software using the rewritten text resource file 21. Thereafter, the controlling section 10 advances the operation to STEP S42.

At STEP S42, the controlling section 10 (more specifically, the verification-target character string output unit 15) displays a GUI screen. With this operation, a screen, more specifically, a screen shown in FIG. 4(b), is displayed. Thereafter, the controlling section 10 advances the operation to STEP S43.

At STEP S43, the controlling section 10 determines whether or not a character string displayed on the GUI is selected. More specifically, the controlling section 10 determines whether or not the retrieval-target character string 42 displayed on the GUI is selected and whether or not the user (i.e., the tester) has executed an action to display the location data 45 by the verification software. If the character string displayed on the GUI is selected (YES is determined in the processing performed at STEP S43), the controlling section 10 advances the operation to STEP S44. On the other hand, if the character string displayed on the GUI is not selected (NO is determined in the processing performed at STEP S43), the controlling section 10 continuously performs the processing of STEP S43, and waits for the character string displayed on the GUI to be selected.

At STEP S44, the controlling section 10 (more specifically, the decoding unit 16) decodes <encoded ID> of the character string into the ID 43. Thereafter, the controlling section 10 advances the operation to STEP S45.

At STEP S45, the controlling section 10 (more specifically, the extracting unit 17) extracts location data (an absolute path of the file including a directory) of the text resource file 21 from the mapping file 22 on the basis of the ID 43. Thereafter, the controlling section 10 advances the operation to STEP S46.

At STEP S46, the controlling section 10 (more specifically, the mapping data output unit 18) displays information including the location data 45 of the text resource file 21 extracted at STEP S45 on a screen. Thereafter, the controlling section 10 advances the operation to STEP S47.

At STEP S47, the controlling section 10 (more specifically, the retrieving unit 19) retrieves other text resource files 21 having the same key as that corresponding to the character string from the storage section 20. Furthermore, the controlling section 10 (more specifically, the retrieving unit 19) displays property information of the retrieved other text resource files 21 on the screen in comparison with the property information of the text resource file 21 including the character string. The property information corresponds to key names and bundle names. Thereafter, the controlling section 10 terminates this operation.

Figure 12:
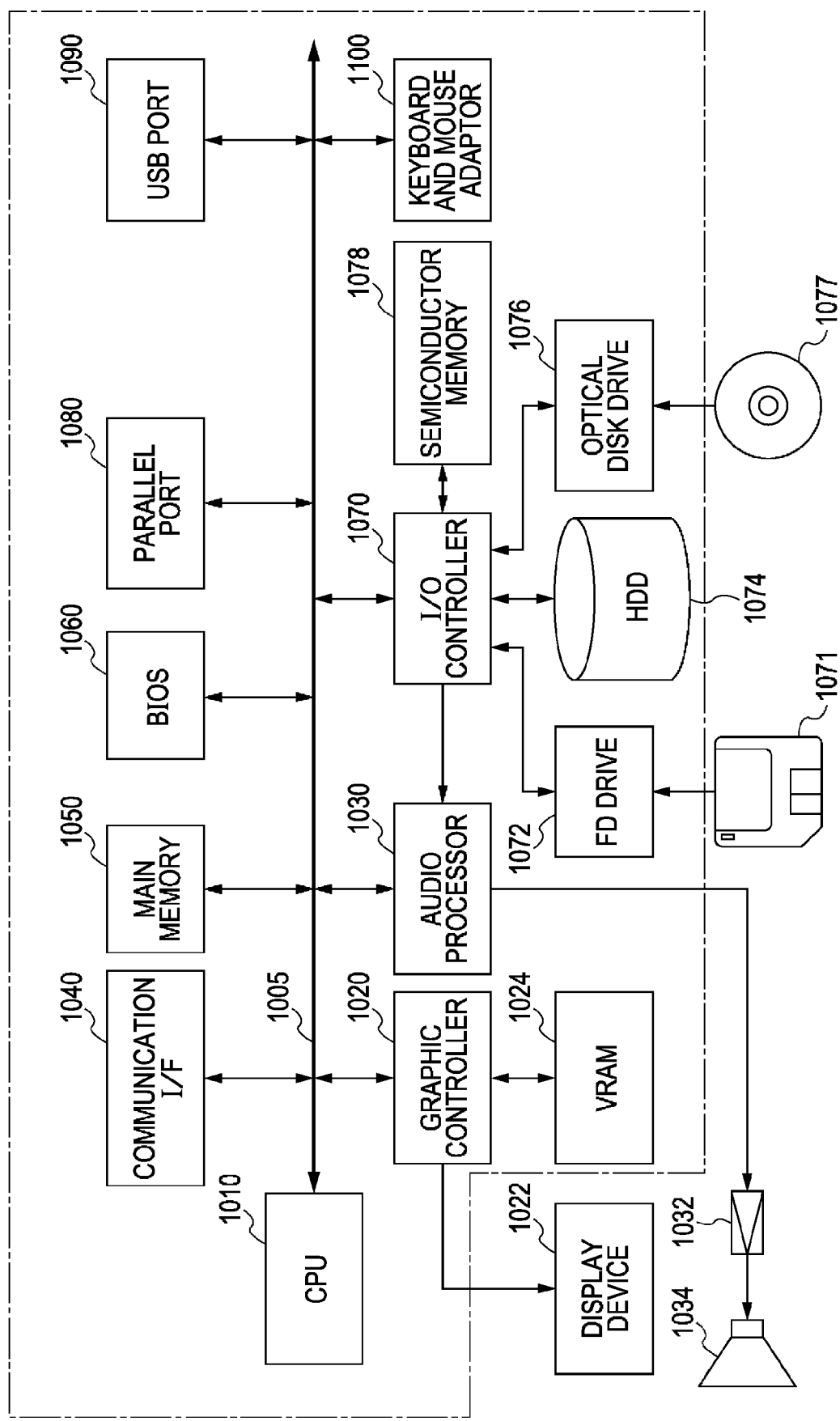
FIG. 12 is a diagram showing a hardware configuration of a device according to an embodiment of the present invention.

FIG. 12 is a diagram showing a hardware configuration of the device 1 according to an embodiment of the present invention. Although a general configuration will be described for an information processing device, which is generally a computer, it is needless to say that a minimum configuration is selectable according to the environment in the case of a dedicated machine or a built-in device.

The device 1 includes a CPU (Central Processing Unit) 1010, a bus 1005, a communication interface (I/F) 1040, a main memory 1050, a BIOS (Basic Input Output System) 1060, a parallel port 1080, a USB port 1090, a graphic controller 1020, a VRAM 1024, an audio processor 1030, an input/output (I/O) controller 1070, and input means such as a keyboard and mouse adapter 1100. Storages means, such as a flexible disk (FD) drive 1072, a hard disk drive (HDD) 1074, an optical disk drive 1076, and a semiconductor memory 1078, can be connected to the I/O controller 1070. A display device 1022 is connected to the graphic controller 1020. In addition, an amplifier circuit 1032 and a speaker 1034 are optionally connected to the audio processor 1030.

The BIOS 1060 stores a boot program executed by the CPU 1010 at the time of booting of the device 1 and hardware-dependent programs depending on hardware of the device 1. The FD (flexible disk) drive 1072 reads programs or data from a flexible disk 1071, and supplies the programs or the data to the main memory 1050 or the hard disk drive 1074 through the I/O controller 1070.

For example, a DVD-ROM drive, a CD-ROM drive, a DVD-RAM drive, or a CD-RAM drive can be used as the optical disk drive 1076. In this case, it is necessary to use an optical disk 1077 corresponding to each drive. The optical disk drive 1076 reads programs or data from the optical disk 1077 and may supply the program or the data to the main memory 1050 or the hard disk drive 1074 through the I/O controller 1070.

Computer programs may be stored on a recording medium, such as the flexible disk 1071, the optical disk 1077, or a memory card (not shown), and supplied to the device 1 by a user. The computer programs are read out from the recording medium through the I/O controller 1070 or are downloaded through the communication I/F 1040, thereby being installed in the device 1 and executed. Since the operations that the computer programs cause the information processing device to perform are the same as those performed in the device having been already described, description thereof is omitted.

The computer programs described above may be stored on external recording media. In addition to the flexible disk 1071, the optical disk 1077, or the memory card, a magneto-optical recording medium such as an MD and a tape medium can be used as the recording media. In addition, the computer programs may be supplied to the device 1 via a communication network using a storage device, such as a hard disk or an optical disk library, provided in a server system connected to a private communication network or the Internet as the recording medium.

The device 1 has been described in the above example. Functions similar to those of the above-described information processing device can be realized by installing programs, having the functions described regarding the information processing device, in a computer and causing the computer to function as the information processing device. Accordingly, the information processing device that is described as one embodiment of the present invention can be realized by a method and a computer program thereof.

The device 1 according to an embodiment of the present invention can be realized by hardware, software, or a combination of hardware and software. When the device 1 is embodied by the combination of hardware and software, an embodiment as a computer system having a predetermined program can be cited as a typical example. In such a case, the program is loaded to the computer system and executed, thereby causing the computer system to perform operations according to the embodiments of the present invention. This program may be constituted by a group of instructions representable by a given language, code, or description. Such a group of instructions enables the system to perform specific functions directly or after one of or both of (1) conversion to other languages, codes, or descriptions and (2) copying to other media is performed. Needless to say, the present invention includes not only such a program itself but also a program product having the program recorded on a medium within a scope thereof. The program for enabling functions of the present invention to be performed can be stored on any computer-readable medium, such as a flexible disk, an MO, a CD-ROM, a DVD, a hard disk drive, a ROM, an MRAM, and a RAM. To store such program on a computer-readable medium, the program can be downloaded from other computer systems connected through a communication network or copied from other media. Additionally, such a program may be stored on one or more recording media after being compressed or divided into a plurality of groups.

Although embodiments of the present invention have been described above, the present invention is not limited to the above-described embodiments. In addition, advantages described in the embodiments of the present invention are only the most preferable advantages resulting from the present invention, and the advantages of the present invention are not limited to those described in the embodiments and the examples of the present invention.

What is claimed is:

1. A device for outputting a storage location of a verification-target character string to be output by software, the device comprising:
   one or more processors;
   an input section;
   a display section; and
   a controlling section including
     an assigning unit for assigning an ID to each verification-target character string,
     a mapping file creating unit for creating a mapping file in which location data, regarding a location of a text resource file including the verification-target character string that corresponds to the assigned ID and a location of the verification-target character string in the text resource file, is associated with the assigned ID,
     an encoding unit for encoding the assigned ID into a zero-width character string invisible to a user,
     a character-string concatenating unit for concatenating the encoded zero-width character string to the verification-target character string, corresponding to the ID, included in the text resource file,
     a verification-target character string output unit for outputting the verification-target character string including the zero-width character string on the display section using the text resource file,
     a decoding unit for decoding, in response to reception of a verifier's input of selecting the displayed verification-target character string including the zero-width character string from the input section, the encoded zero-width character string into the ID,
     an extracting unit for extracting the location data from the mapping file on the basis of the decoded ID, and
     a mapping data output unit for outputting mapping data including the extracted location data on the display section.

2. The device according to claim 1, wherein the encoding of the assigned ID into the zero-width character string is performed using a character control code that is not displayed on a screen.

3. The device according to claim 2, wherein
   the ID is an integer value, and wherein
   the encoding unit converts the ID on the basis of a predetermined radix.

4. The device according to claim 2, wherein
   the ID is an integer value, and wherein
   the encoding unit decides a radix according to the value of the integer ID, and converts the ID on the basis of the decided radix.

5. The device according to claim 4, wherein
   the encoded ID includes
   a start character that indicates a start of a character string,
   a digit separating character that is repeated as many times as the value of the radix,
   a digit character that is repeated as many times as a value of each digit, and
   an end character that indicates an end of the character string, and wherein
   the digit separating character is inserted in front of the repeated digit characters as a character that indicates a separation of each digit.

6. The device according to claim 5, wherein
   the start character and the end character are the same character.

7. The device according to claim 1, wherein
   the text resource file is stored in the device or in an external storage device connected to the device via a network, and
   the text resource file includes a key corresponding to the verification-target character string.

8. The device according to claim 7, wherein
   the controlling section further includes a retrieval unit for retrieving another text resource file, different from the text resource file having the key corresponding to the verification-target character string, that includes the same key as the key corresponding to the verification-target character string, and wherein
   the display section displays, in response to reception of the verifier's input of selecting from the input section, property information of the text resource file in comparison with property information of the retrieved other text resource file.

9. The device according to claim 7, wherein
   the device or the external storage device further stores a correspondence file including another character string to be output by the software and a key corresponding to the other character string, and wherein
   the display section displays, in response to reception of the verifier's input of selecting from the input section, property information of the text resource file in comparison with property information of the correspondence file having the same key as the text resource file.

10. The device according to claim 1, wherein the display section further displays a program module that is invoked by the software and that uses the text resource file.

11. The device according to claim 1, wherein the verification-target character string output unit outputs the verification-target character string including the zero-width character string on the display section by activating verification software.

12. The device according to claim 11, wherein a key operation used by the verifier to input the selection is assigned from key operations that are not pre-assigned to operations of the verification software.

13. The device according to claim 1, wherein the display section displays a graphical user interface included in the software.

14. The device according to claim 1, wherein the verification-target character string includes a type of translated character strings.

15. A method for outputting a storage location of a verification-target character string to be output by software, the method comprising the steps of:
assigning an ID to each verification-target character string;
creating a mapping file in which location data, regarding a location of a text resource file including the verification-target character string that corresponds to the assigned ID and a location of the verification-target character string in the text resource file, is associated with the assigned ID;
encoding the assigned ID into a zero-width character string invisible to a user;
concatenating the encoded zero-width character string to the verification-target character string, corresponding to the ID, included in the text resource file;
displaying the verification-target character string including the zero-width character string using the text resource file;
decoding, in response to reception of a verifier's input of selecting the displayed verification-target character string including the zero-width character string, the encoded zero-width character string into the ID;
extracting the location data from the mapping file on the basis of the decoded ID; and
displaying mapping data including the extracted location data.

16. A computing device comprising:
a processor coupled to a memory;
a user interface configured to accept user input, and configured to present output to a user, wherein said user interface is defined by digitally encoded information stored within a computer-usable medium, wherein said digitally encoded information when utilized by a computing device having access to the computer usable medium utilizes said digitally encoded information to cause said computing device to perform programmatic actions for which said user interface is configured; said user interface comprising:
at least one display control configured to display text;
a source selection control configured to permit a user to select said display control, wherein said source location specifies a location of a text resource file associated with said user interface control; said computing device further comprising:
a controlling section including
an assigning unit for assigning an ID to each verification-target character string,
a mapping file creating unit for creating a mapping file in which location data, regarding the location of the text resource file including the verification-target character string that corresponds to the assigned ID and a location of the verification-target character string in the text resource file, is associated with the assigned ID,
an encoding unit for encoding the assigned ID into a zero-width character string invisible to a user,
a character-string concatenating unit for concatenating the encoded zero-width character string to the verification-target character string, corresponding to the ID, included in the text resource file,
a verification-target character string output unit for outputting the verification-target character string including the zero-width character string on the display section using the text resource file,
a decoding unit for decoding, in response to reception of a verifier's input of selecting the displayed verification-target character string including the zero-width character string from the input section, the encoded zero-width character string into the ID,
an extracting unit for extracting the location data from the mapping file on the basis of the decoded ID, and
a mapping data output unit for outputting mapping data including the extracted location data on the display section; and
a presentation section configured to display a source location from which text displayed within said at least one display control is acquired responsive to a selection of the display control via the user selection control.

17. The computing device of claim 16, wherein said user interface is an interface of an international version of a software application, wherein said international version of the software application comprises a plurality of translation files, wherein each of said plurality of translation files is associated with text that is mapped to at least one control of said user interface, wherein said source location corresponds to a name and a storage location to one of the translation files, and wherein said text displayed by said display control is populated by data stored in a translation field associated with the source location.

18. The computing device of claim 17, further comprising:
a mapping component configured to map each text item of each translation files to at least one interface control;
a source determination engine configured to receive an identifier for an interface control, configured to determine to query said mapping component to determine an associated translation file associated with the identifier, and configured to provide a string specifying said source location.

19. The computing device of claim 18, wherein said user interface is at least one of a graphical user interface and a voice user interface.

* * * * *